United States Patent
Bhiravabhatla et al.

(10) Patent No.: US 11,037,358 B1
(45) Date of Patent: Jun. 15, 2021

(54) METHODS AND APPARATUS FOR REDUCING MEMORY BANDWIDTH IN MULTI-PASS TESSELLATION

(71) Applicant: QUALCOMM Incorporated, San Diego, CA (US)

(72) Inventors: Kalyan Kumar Bhiravabhatla, Bengaluru (IN); Sreyas Kurumanghat, Bangalore (IN); Vishwanath Shashikant Nikam, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/733,919

(22) Filed: Jan. 3, 2020

(51) Int. Cl.
*G06T 15/00* (2011.01)

(52) U.S. Cl.
CPC ................... *G06T 15/005* (2013.01)

(58) Field of Classification Search
CPC .................................................. G06T 15/005
See application file for complete search history.

(56) References Cited

U.S. PATENT DOCUMENTS

| | | | | |
|---|---|---|---|---|
| 8,379,025 B1* | 2/2013 | Carr | ........................ | G06T 15/06 345/426 |
| 2013/0265309 A1* | 10/2013 | Goel | ....................... | G06T 15/00 345/426 |
| 2014/0184617 A1* | 7/2014 | Palmer | ...................... | G06T 1/20 345/506 |
| 2015/0091913 A1* | 4/2015 | Sathe | .................... | G06T 15/005 345/506 |
| 2017/0358132 A1* | 12/2017 | Munshi | ................. | G06T 15/005 |
| 2020/0184704 A1* | 6/2020 | Naganuma | .............. | G06T 15/04 |

* cited by examiner

*Primary Examiner* — Maurice L. McDowell, Jr.
*Assistant Examiner* — Donna J. Ricks
(74) *Attorney, Agent, or Firm* — Campbell C. Chiang

(57) ABSTRACT

The present disclosure relates to methods and apparatus for graphics processing. Aspects of the present disclosure can determine at least some shading data for each of a plurality of patches. Further, aspects of the present disclosure can store the at least some shading data for each of the plurality of patches in a GMEM. Additionally, aspects of the present disclosure can communicate the at least some shading data for each of the plurality of patches. In some aspects, the present disclosure can configure the GMEM for storing the at least some shading data for each of a plurality of patches. Aspects of the present disclosure can also calculate when the GMEM has stored a maximum amount of shading data. Moreover, aspects of the present disclosure can divide each of the plurality of patches into one or more sub-patches when the GMEM has stored the maximum amount of shading data.

30 Claims, 11 Drawing Sheets

METHODS AND APPARATUS FOR REDUCING MEMORY BANDWIDTH IN MULTI-PASS TESSELLATION

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can configure a graphics processing unit (GPU) memory (GMEM) for storing at least some shading data for each of a plurality of patches. The apparatus can also determine the at least some shading data for each of a plurality of patches. Additionally, the apparatus can copy the at least some shading data for each of the plurality of patches to the GMEM. The apparatus can also store the at least some shading data for each of the plurality of patches in the GMEM. The apparatus can also calculate when the GMEM has stored a maximum amount of shading data. Moreover, the apparatus can divide each of the plurality of patches into one or more sub-patches when the GMEM has stored the maximum amount of shading data. The apparatus can also communicate the at least some shading data for each of the plurality of patches. Further, the apparatus can process the at least some shading data when the at least some shading data is communicated. The apparatus can also remove the at least some shading data from the GMEM when the at least some shading data is processed.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
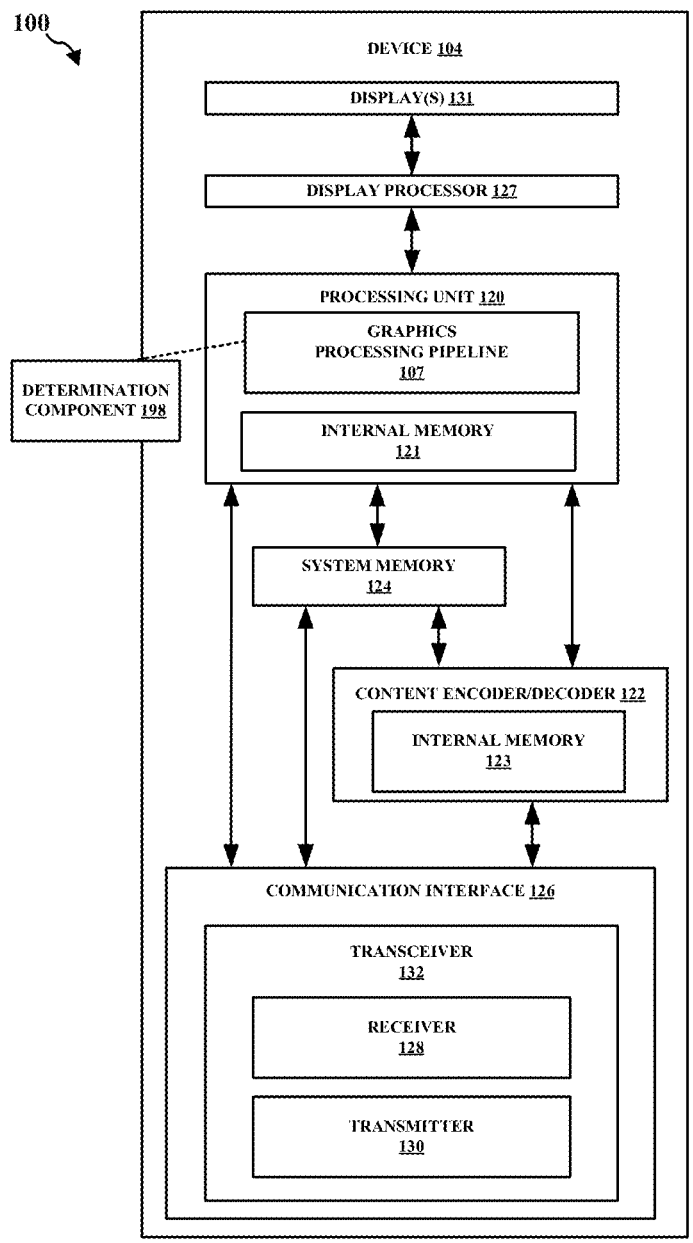
FIG. 1 is a block diagram that illustrates an example content generation system in accordance with one or more techniques of this disclosure.

Some GPUs may disable bin mode rendering when tessellation is enabled due to performance reasons. For instance, there may be an increased bandwidth and/or reduced performance levels if both bin rendering mode and tessellation are enabled. Additionally, storing data to the main memory and/or retrieving data from the main memory can utilize increased memory bandwidth. For example, during a tessellation process, reading and writing memory to the main memory can incur a lot of bandwidth. Aspects of the present disclosure can re-purpose or reconfigure the GMEM as a buffer for tessellation use cases. For instance, aspects of the present disclosure can utilize the GMEM during the tessellation process to store data, so that the main memory may not need to be utilized. Accordingly, the GMEM can be used as an intermediate buffer to store tessellation data in order to reduce bandwidth and/or increase performance. This approach can have both performance and power benefits by reducing the bandwidth and reducing the latency of patch buffer requests to the system memory.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/ or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to configure a graphics processing unit (GPU) memory (GMEM) for storing at least some shading data for each of a plurality of patches. The determination component 198 can also be configured to determine the at least some shading data for each of a plurality of patches. The determination component 198 can also be configured to copy the at least some shading data for each of the plurality of patches to the GMEM. The determination component 198 can also be configured to store the at least some shading data for each of the plurality of patches in the GMEM. The determination component 198 can also be configured to calculate when the GMEM has stored a maximum amount of shading data. The determination component 198 can also be configured to divide each of the plurality of patches into one or more sub-patches when the GMEM has stored the maximum amount of shading data. The determination component 198 can also be configured to communicate the at least some shading data for each of the plurality of patches. The determination component 198 can also be configured to process the at least some shading data when the at least some shading data is communicated. The determination component 198 can also be configured to remove the at least some shading data from the GMEM when the at least some shading data is processed.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
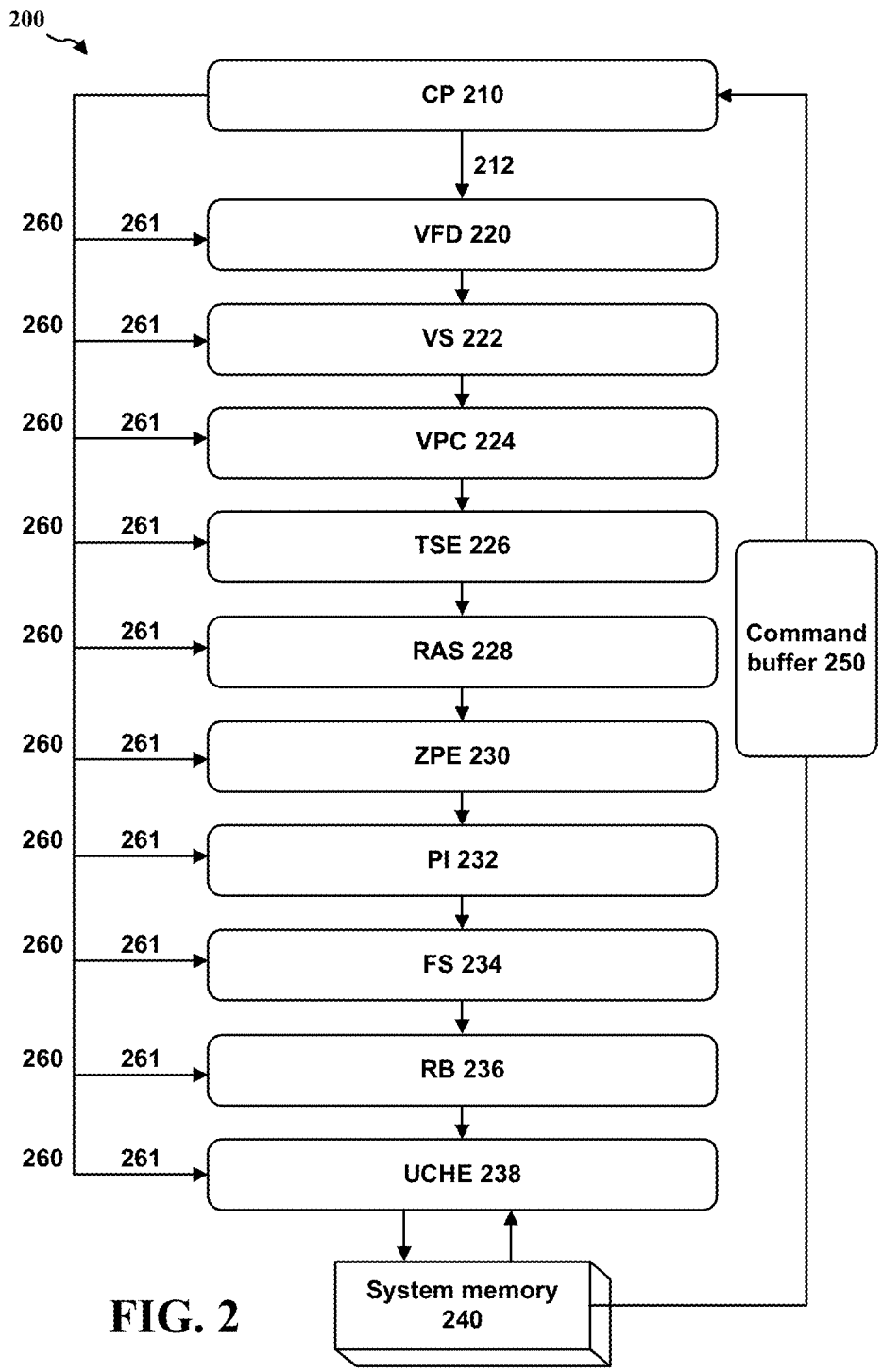
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
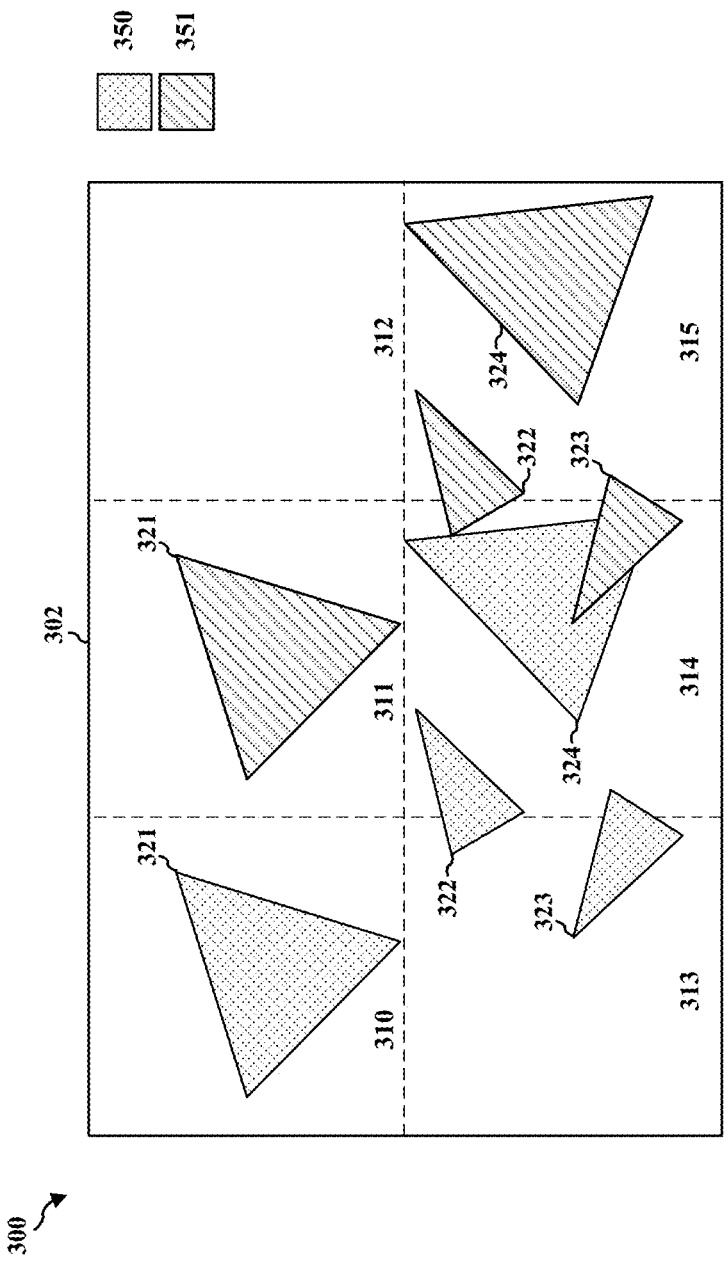
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, wherein, as discussed above, a surface is divided into multiple bins or tiles and then each bin or tile can be separately rendered. Further, in tiled rendering, the frame buffer can be partitioned into multiple bins or tiles.

As indicated herein, in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some aspects, GPUs can perform a tessellation or tessellation process. During a tessellation process, larger primitives can be divided into smaller sub-primitives or tessellated primitives. Tessellation can divide an image into more detailed sub-primitives or tessellated primitives, which can lead to a more detailed rendering process and more detailed graphical content. A tessellator can determine or generate the sub-primitives or tessellated primitives. In some aspects, one or more primitives can be grouped into a patch. A tessellator can then determine or generate a geometry-based tessellation of the patch, e.g., using triangles or rectangles, according to one or more tessellation parameters.

The tessellation process can allow for determining or generating a more detailed or smoother image or surface than would otherwise be generated based on the original patch of primitives. Additionally, tessellation can be used for implementing or rendering more detailed surfaces in an image. As mentioned above, the tessellation process can produce sub-primitives or tessellated primitives. These sub-primitives or tessellated primitives are generated as an output from the tessellation, e.g., based on one or more primitives or patches. These primitives can also be referred to as original or regular primitives, which are generated based on the original image or surface value. The determined or generated sub-primitives or tessellated primitives can be a more detailed version of the original primitive or patch. In some instances, each of the sub-primitives can be smaller than each of the primitives or patch. Accordingly, the original primitives may appear to be divided into the sub-primitives or tessellated primitives.

Figure 4:
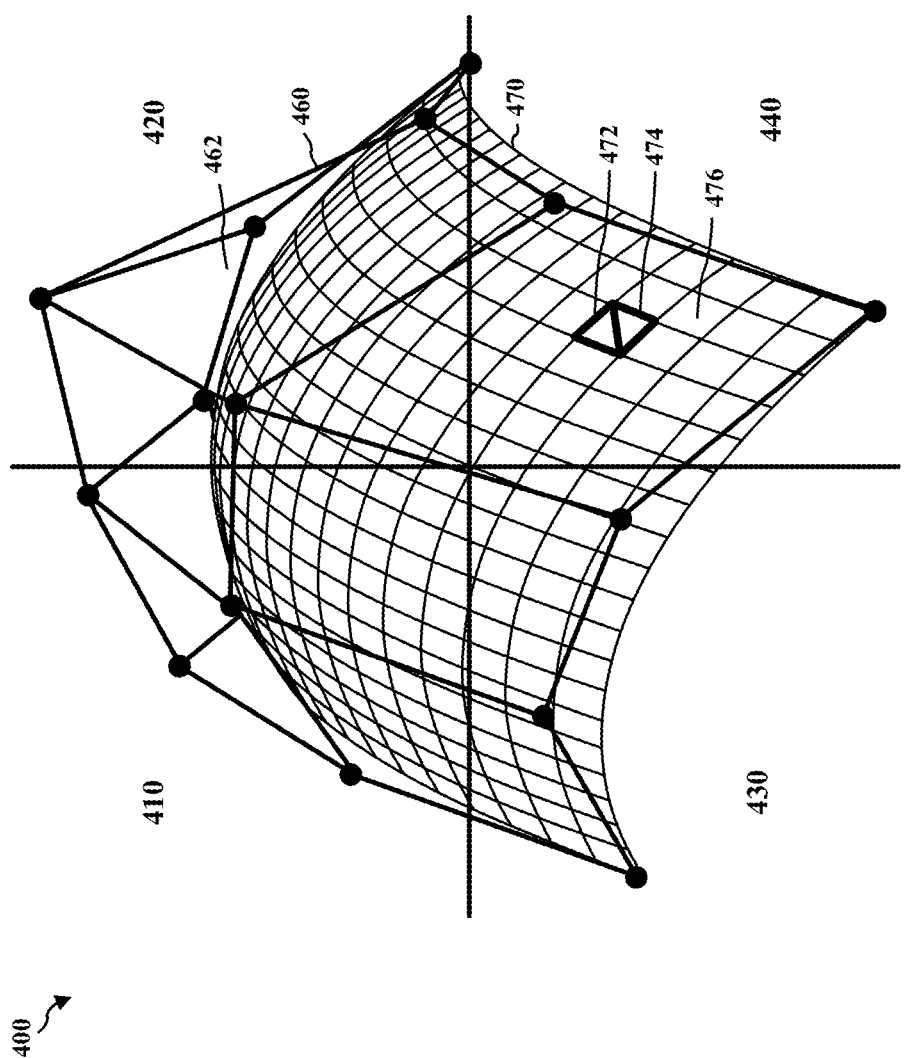
FIG. 4 illustrates an example image or surface in accordance with one or more techniques of this disclosure.

FIG. 4 illustrates an example image or surface 400 in accordance with one or more techniques of this disclosure. FIG. 4 illustrates that the image 400 is divided into multiple bins, e.g., bin 410, bin 420, bin 430, and bin 440. Also, FIG. 4 displays patch 460 which includes one or more primitives 462. In some aspects, patch 460 can be referred to as a group of primitives or one or more primitives. FIG. 4 also displays a plurality of sub-primitives 470 which includes sub-primitive 472, sub-primitive 474, and sub-primitive 476. As shown in FIG. 4, the individual sub-primitives in the plurality of sub-primitives 470 can be a number of different shapes such as rectangles, e.g., sub-primitive 476, or triangles, e.g., sub-primitives 472, 474.

FIG. 4 displays an example of the aforementioned tessellation process. For example, the original or input primitives, e.g., one or more primitives 462 in patch 460, are displayed as the larger triangles with the dots as vertices. The sub-primitives or tessellated primitives, e.g., sub-primitives 470, that are output from the tessellation process are displayed as the smaller rectangles or triangles on the surface 400, e.g., sub-primitives 472, 474, 476.

Memory bandwidth can utilize a high amount of power in a GPU. For instance, GPUs can emphasize a reduction in memory bandwidth in order to minimize power consumption. This can be the case for number of devices utilizing GPUs, e.g., mobile devices or smart phones. As such, there has been an effort to reduce the memory bandwidth in mobile device GPUs.

Device performance is another important aspect of reducing memory bandwidth or power consumption. For example, reducing the memory bandwidth can be translated into improved performance. In some aspects of GPUs, the on-chip memory may be close to a shader subsystem. Based on this, the time taken to store and load patch information to on-chip memory may need a shorter time duration compared to storing and loading to the system memory.

As indicated above, tessellation is the process of subdividing a surface into smaller triangles. For example, tessellation can divide primitives, triangles, or patches that are already present on the surface into smaller primitives, triangles, or patches. Subdividing the patches can also result in an input with a higher order surface. Additionally, a tessellator can perform the subdividing of the patches, rather than the CPU, which may need an increased memory bandwidth. Thus, the tessellation process can be performed in the GPU pipeline so the CPU does not have to utilize an increased memory bandwidth.

As indicated herein, tessellation can provide a high level of surface detail. Further, the process can be adjustable with low or high levels of tessellation. For example, if an object is small or depicted as being far from a display panel, then a lower level of tessellation can be utilized. Tessellation is also an important feature supported in many application programming interfaces (APIs) and is becoming a norm in these applications for an improved level of detail. Additionally, tessellated draws may need a big bottleneck in memory bandwidth, which may need to be reduced by bandwidth reduction techniques.

Figure 5:
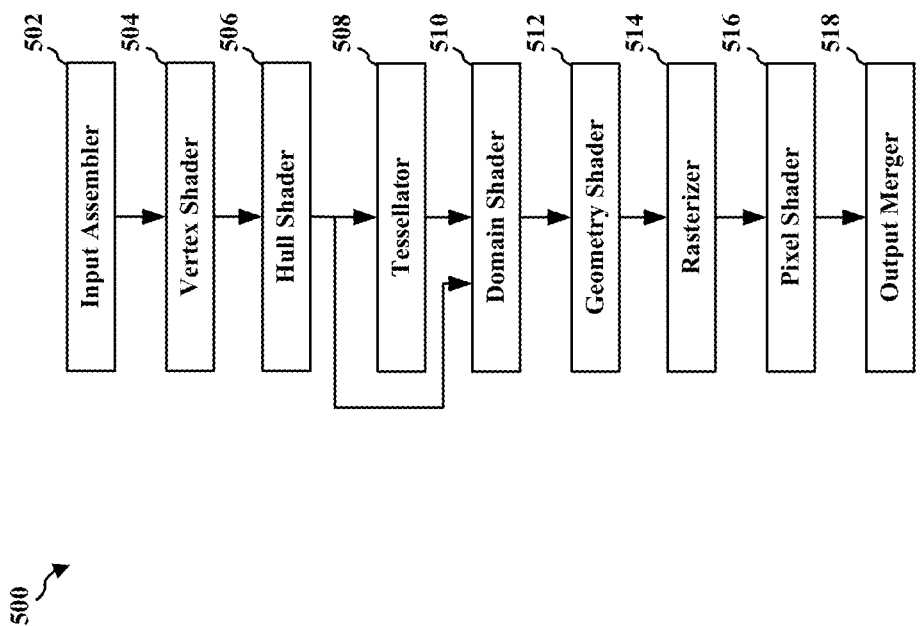
FIG. 5 illustrates an example GPU pipeline in accordance with one or more techniques of this disclosure.

FIG. 5 illustrates a GPU pipeline 500 in accordance with one or more techniques of this disclosure. As shown in FIG. 5, GPU pipeline 500 includes input assembler 502, vertex shader 504, hull shader 506, tessellator 508, domain shader 510, geometry shader 512, rasterizer 514, pixel shader 516, and output merger 518.

FIG. 5 shows an example of a graphics pipeline with tessellation support. For instance, two shader stages are included in the GPU pipeline, e.g., hull shader 506 and domain shader 510, as well as a fixed function stage, e.g., tessellator 508. Vertex shading is a standard shading of vertices, e.g., based on the use of vertex transformations. Hull shading generates tessellation factors that may be needed in the tessellation process. Also, hull shading can transform input points that are stored for control points.

As shown in FIG. 5, some aspects of GPU architecture can utilize an input assembler, e.g., input assembler 502, which can provide vertices from the GPU memory (GMEM). After this process, the GPU can perform the vertex shading and the hull shading, e.g., via vertex shader 504 and hull shader 506. The GPU can also utilize a tessellator, a domain shader, a geometry shader, a rasterizer, a pixel shader, and an output merger, e.g., tessellator 508, domain shader 510, geometry shader 512, rasterizer 514, pixel shader 516, and output merger 518. The diagram in FIG. 5 shows how one aspect of a tessellation implementation may be performed.

Figure 6:
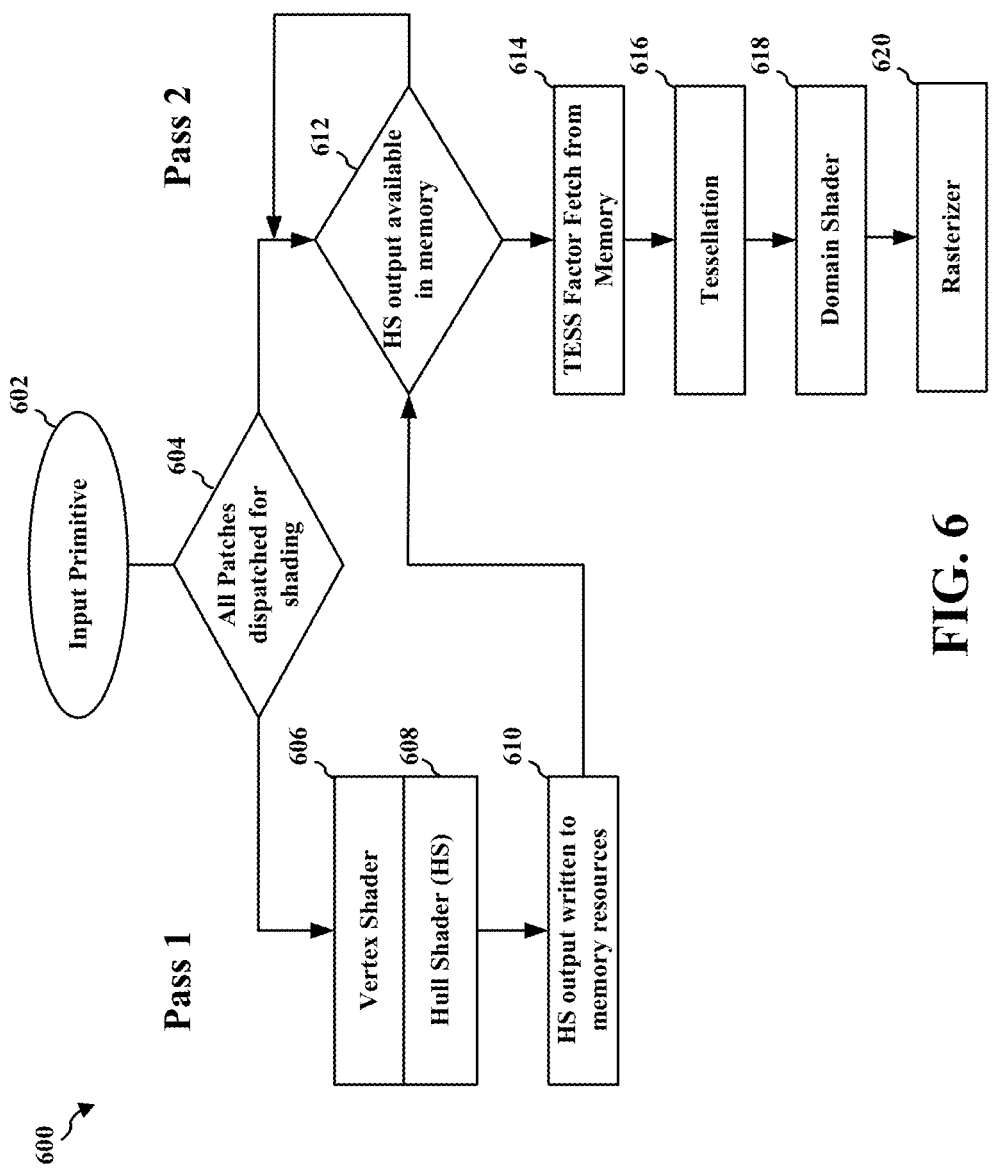
FIG. 6 illustrates an example diagram including a multi-pass approach in accordance with one or more techniques of this disclosure

FIG. 6 illustrates a diagram 600 including a multi-pass approach in accordance with one or more techniques of this disclosure. As shown in FIG. 6, diagram 600 includes input primitive 602, vertex shader 606, hull shader (HS) 608, tessellation process 616, domain shader 618, and rasterizer 620. At 604, all patches can be dispatched for shading. At 610, the hull shader output may be written to memory resources. At 612, the hull shader output can be available in memory. Also, at 614, the tessellation (TESS) factor fetch may be obtained from memory.

The tessellation process in current GPU architecture can utilize a multi-pass approach. For instance, FIG. 6 displays a two pass approach to support tessellation in GPU architecture, e.g., pass 1 and pass 2. More specifically, FIG. 6 shows the flow diagram for a multi-pass approach for tessellation. The tessellation flow is split into two parts, e.g., the hull shader pass in pass 1 and domain shader pass in pass 2.

During the first pass, the patch information from the hull shader can be stored back to system memory. Additionally, in the first pass, the input patches can be read, and the vertex shading and/or hull shading can be performed for all available patches. Also, the hull shader output can be written to memory resources.

During the second pass, the patch information can be retrieved and consumed in the domain shader. Also, in the second pass, the data from pass 1 can be fetched, e.g., the TESS factor fetch from memory. The tessellation can be performed before the domain shader is invoked, which can read the output data from the previously generated hull shader output. The domain shader may read this data multiple times. As such, the second pass can read the hull shader output from the main memory to the GPU.

As displayed in FIG. 6, an input primitive or patch can be dispatched for shading, and then be sent to the vertex shader or the hull shader. After this, the hull shader output can be written to memory resources. Once the hull shader output is written to the memory, this output can be available in pass 2.

Figure 7:
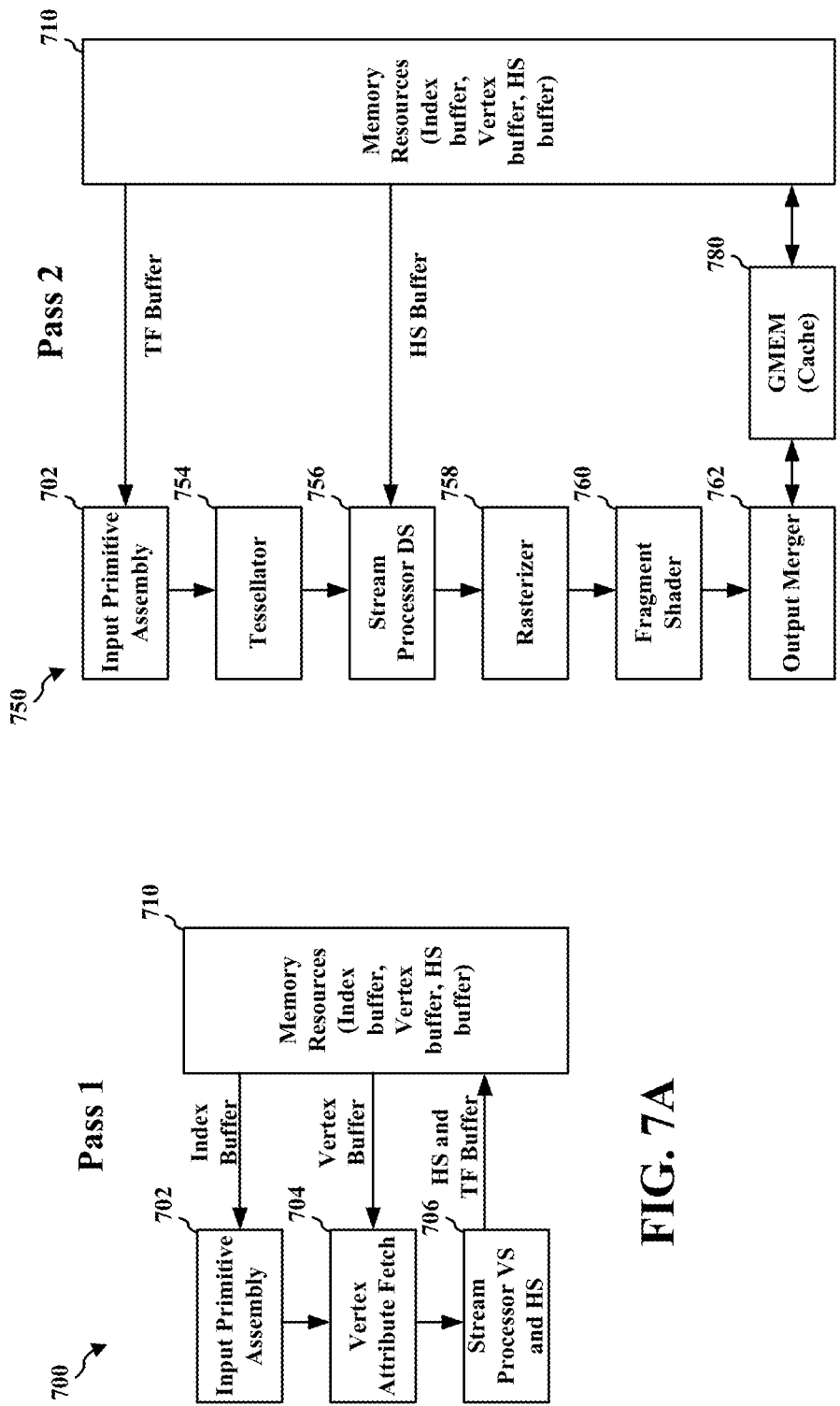
FIGS. 7A and 7B illustrate example GPU architectures in accordance with one or more techniques of this disclosure.

FIGS. 7A and 7B illustrate GPU architecture 700 and GPU architecture 750, respectfully. As shown in FIG. 7A, GPU architecture 700 includes input primitive assembly 702, vertex attribute fetch 704, stream processor for a vertex shader (VS) and hull shader (HS) 706, and memory resources 710, which can include an index buffer, a vertex buffer, and a HS buffer. As further shown in FIG. 7A, an index buffer can be sent from the memory resources 710 to the input primitive assembly 702, a vertex buffer can be sent from the memory resources 710 to the vertex attribute fetch 704, and a HS and TESS factor (TF) buffer can be sent from the stream processor 706 to the memory resources 710.

As shown in FIG. 7B, GPU architecture 750 includes input primitive assembly 702, tessellator 754, stream processor for a domain shader (DS) 756, rasterizer 758, fragment shader 760, output merger 762, GMEM 780, and memory resources 710, which can include an index buffer, a vertex buffer, and a HS buffer. Additionally, as shown in FIG. 7B, a TF buffer can be sent from the memory resources 710 to the input primitive assembly 702, and a HS buffer can be sent from the memory resources 710 to the stream processor 756.

FIGS. 7A and 7B display a GPU architecture for a two pass approach for a tessellation workload, e.g., pass 1 in FIG. 7A and pass 2 in FIG. 7B. In other words, FIGS. 7A and 7B show a GPU architecture block diagram that supports tessellation. As shown in FIGS. 7A and 7B, the input primitive assembly block and the stream processor block can be shared between pass 1 and pass 2.

In pass 1, during the vertex attribute fetch process, the vertex data can be read. After the vertex shader and hull shader are finished processing, the hull shader and TESS factor (TF) data can be written to memory resources 710. The output of pass 1 can be TF and patch constant data that is written to system memory buffers, namely the TF buffer and HS buffer.

When the pass 1 data is available and pass 2 starts, the TF buffer and HS buffer data can again be read from memory to the input primitive assembly 702 and the stream processor 756. Also, during the second pass, the TF data can be read. Once the fragment shader and rasterizer are finished processing, the data can be written back to the GMEM 780 and the memory resources 710. The GMEM 780 can act as a buffer, e.g., a tile buffer in tiled mode rendering. Once the tiled processing is finished, the data be written back to the main memory for the CPU or GPU.

Figure 8:
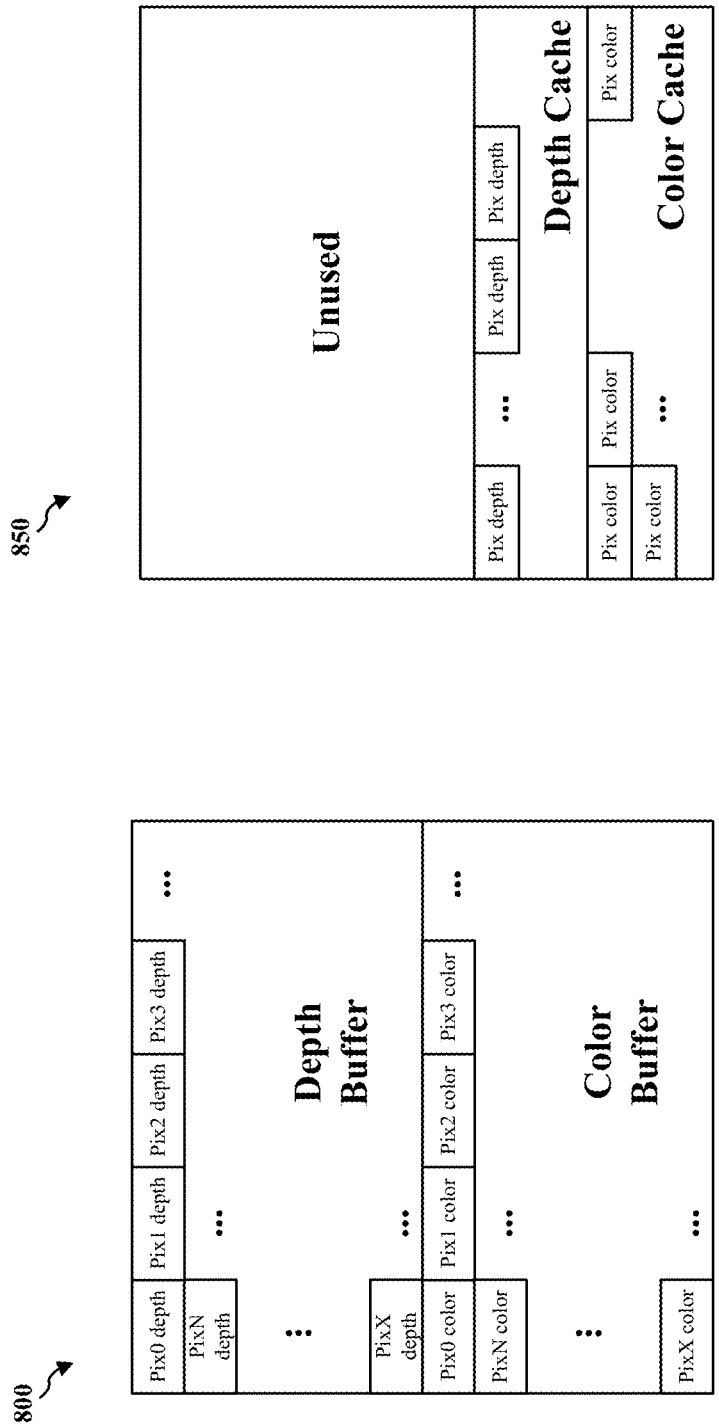
FIGS. 8A and 8B illustrate example GMEM layouts in accordance with one or more techniques of this disclosure.

FIGS. 8A and 8B illustrate GMEM layout 800 and GMEM layout 850, respectively, in accordance with one or more techniques of this disclosure. FIG. 8A displays GMEM layout 800 in tiled rendering mode and FIG. 8B displays GMEM layout 850 in direct rendering mode. More specifically, FIGS. 8A and 8B show how on-chip memory can be utilized.

As shown in FIG. 8A, in tiled rendering mode, for each pixel in the tile being used, the corresponding color and depth value is stored. In tiled rendering mode, this memory can act as a low latency, high bandwidth memory, thereby speeding up the rendering process. Additionally, on-chip memory can be utilized in the tiled rendering approach, e.g., as storage for the color buffer and z buffer for the tile being rendered. For instance, each bin can be rendered individually during the GPU processing, so the rendering target can remain in the GMEM. In some aspects, multiple reads and writes can be performed for this bin before it is resolved back to the main memory.

As shown in FIG. 8B, in the direct rendering mode, a portion of this memory may remain unused. This can provide an opportunity to use this memory to store the patches in the first pass, and then reuse the patches in the second pass to help reduce the workload on the memory path. Additionally, this can help in reducing the latency for the domain shader and the hull shader during store and load operations.

In the case of tiled rendering architecture, where visibility may need to be computed for each bin, tessellated draw calls can be slow to process. This can also be due to the multi-pass approach. Additionally, tessellated draw calls can be slow to process because the visibility information may be generated after both the passes are finished processing.

In some aspects, in the rendering pass, pass 1 and pass 2 may be performed again, e.g., for each patch in each visible tile in the render target. The patch information may also need to be loaded and stored to the system memory, which may also increase the latency. Accordingly, tiled rendering architectures may revert to direct rendering rather than tiled render to increase performance.

In some aspects, bin mode rendering may be disabled when tessellation is enabled due to performance reasons. For instance, bin rendering mode may need an increased bandwidth, as does tessellation, so GPUs may disable bin rendering mode when utilizing tessellation. So there may be increased performance overhead if both bin rendering mode and tessellation are enabled. In some instances, when the bin rendering mode is disabled, the GMEM may not be utilized.

Additionally, storing data to the main memory and/or retrieving data from the main memory can utilize a lot of memory bandwidth. For instance, during a tessellation process, reading and writing memory to the main memory can incur a lot of valuable bandwidth. Based on the above, there is a need to reduce the amount of bandwidth utilized during the tessellation process to store or retrieve data, as well as during bin rendering mode.

Aspects of the present disclosure can re-purpose or reconfigure the GMEM as a buffer for tessellation use cases. By doing so, the GMEM can help to reduce the amount of bandwidth utilized during the tessellation process. For instance, aspects of the present disclosure can utilize the GMEM during the tessellation process to store data, so that the main memory may not need to be utilized. Accordingly, the GMEM can be used as an intermediate buffer to store tessellation data in order to reduce bandwidth and/or increase performance.

As indicated above, aspects of the present disclosure can re-purpose the GMEM for tessellation use cases. In some aspects, the present disclosure can re-purpose the GMEM for tessellation use cases in direct mode rendering. For instance, aspects of the present disclosure can reduce the system memory bandwidth for the tessellation phase by re-purposing the on-chip pixel tile storage as patch storage buffer dynamically. This approach can have both performance and power benefits by reducing the bandwidth and reducing the latency of patch buffer requests to the system memory.

Aspects of the present disclosure can reduce the memory bandwidth during a multi-pass tessellation process based on a number of adjustments. For example, hardware adjustments and/or flow changes for the GPU architecture can include low latency read/write ports added to connect the shader processor to the tile buffer. In some instances, this can involve the read/write ports determining and/or decoding the memory fetch instructions to the patch buffers.

Additionally, changes may be made in the on-chip tile buffer to re-purpose the existing tile buffer to store the patch information. This can involve the tile buffers determining the patch formats that are different from the existing per-pixel buffers. In some aspects, the software or driver may need to change to allocation policy for these buffers from system memory to on-chip buffers.

There may also be cases where the entire patch buffer may not fit into the on-chip storage. In these cases, draw calls may be split into smaller sub-draws that can fit into the available on-chip buffer. Further, compiler changes may read/write the patch information from the on-chip tile buffer, instead of the system memory. Aspects of the present disclosure can also include a capability to store or re-store this buffer to the system memory in the case of a high priority GPU preemption.

Figure 9:
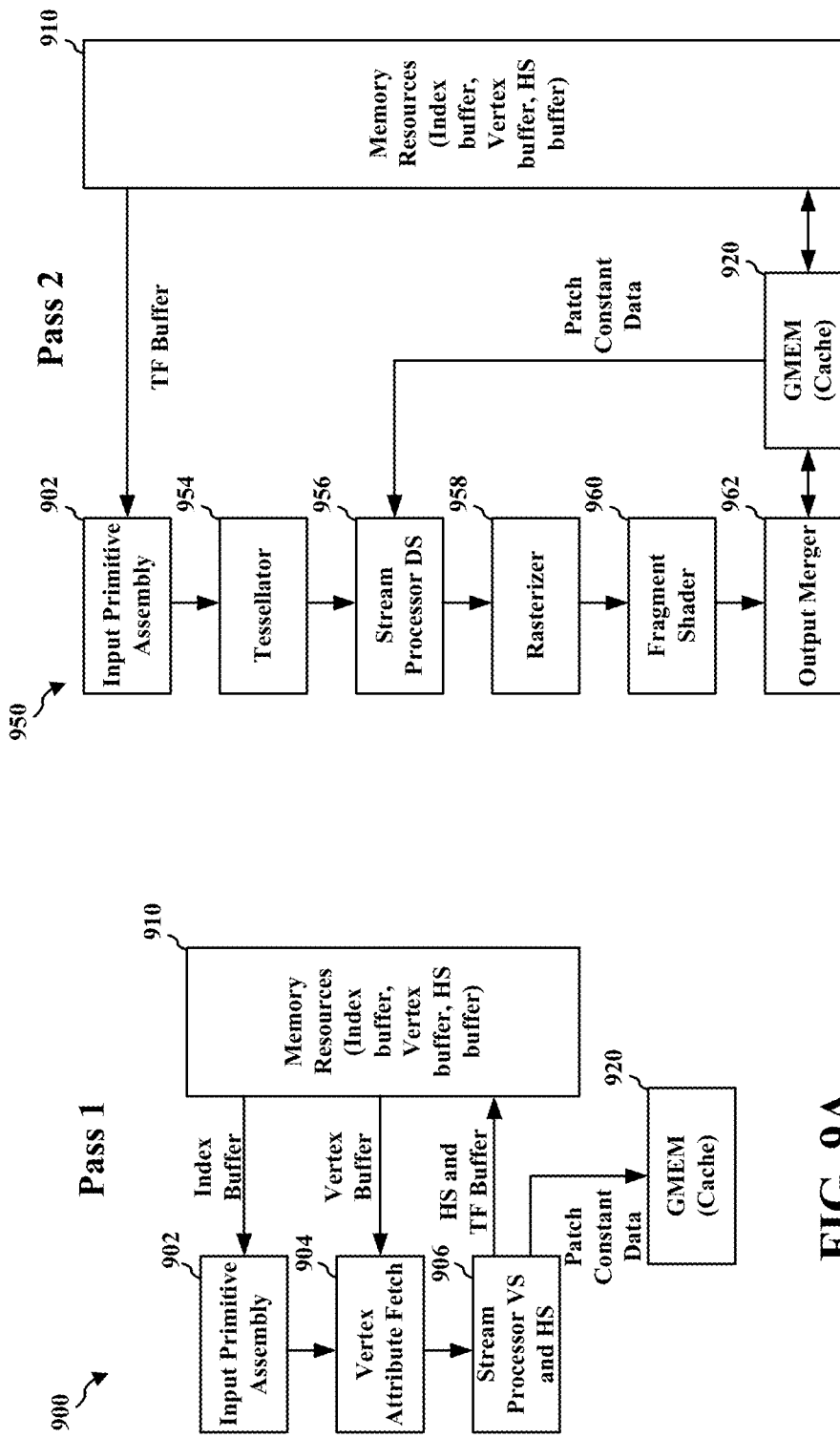
FIGS. 9A and 9B illustrate example GPU architectures in accordance with one or more techniques of this disclosure.

FIGS. 9A and 9B illustrate GPU architecture 900 and GPU architecture 950, respectively, in accordance with one or more techniques of this disclosure. As shown in FIG. 9A, GPU architecture 900 includes input primitive assembly 902, vertex attribute fetch 904, stream processor for a vertex shader (VS) and hull shader (HS) 906, memory resources 910 including an index buffer, a vertex buffer, and a HS buffer, and GMEM or cache 920. As further shown in FIG. 9A, an index buffer can be sent from the memory resources 910 to the input primitive assembly 902. Also, a vertex buffer can be sent from the memory resources 910 to the vertex attribute fetch 904. A HS and TESS factor (TF) buffer can be sent from the stream processor 906 to the memory resources 910. Moreover, patch constant data can be sent from the stream processor 906 to the GMEM 920.

As shown in FIG. 9B, GPU architecture 950 includes input primitive assembly 902, tessellator 954, stream processor for a domain shader (DS) 956, rasterizer 958, fragment shader 960, output merger 962, GMEM 920, and memory resources 910 including an index buffer, a vertex buffer, and a HS buffer. Also, as shown in FIG. 9B, a TF buffer can be sent from the memory resources 910 to the input primitive assembly 902. Additionally, patch constant data can be sent from the GMEM 920 to the stream processor 956.

Although FIGS. 9A and 9B display separate passes, e.g., pass 1 and pass 2, it is understood that these figures can display the same components within these separate passes. For example, the input primitive assemblies 902 in both passes may be the same component. The GMEMs 920 in both passes may also be the same component. Further, the memory resources 910 in both passes may be the same component.

FIGS. 9A and 9B display a GPU architecture according to the present disclosure for a two pass approach of a tessellation workload, e.g., pass 1 in FIG. 9A and pass 2 in FIG. 9B. For instance, FIGS. 9A and 9B show a GPU architecture that supports tessellation. More specifically, FIGS. 9A and 9B show a new path from the stream processor to the on-chip memory or GMEM 920. Also, the TF buffer which was stored to the system memory may be diverted to the on-chip memory from the VS and HS stages in pass 1. As such, the GMEM 920 can be utilized to store a variety of data, e.g., vertex shader data and hull shader data, so the data may not need to be stored in the main memory.

As shown in FIG. 9B, in pass 2, the patch information may be loaded from the on-chip memory or GMEM, rather than being loaded from the system memory. This data can be written to the GMEM 920 in pass 1. In some aspects, once the GMEM 920 is full, then pass 2 can start and this data from the GMEM 920 can be utilized for the domain shading. By doing so, there may be no need for a main memory reading and/or writing process, which can save on memory bandwidth.

As indicated herein, instead of storing and/or retrieving data from the main memory, the present disclosure can reconfigure the GMEM 920 to store this data in pass 1, and then read the data back to the stream processor or domain shader 956 in pass 2, which can save on memory bandwidth. Thus, in the first pass, aspects of the present disclosure can reduce the amount of memory bandwidth to write or store data. In the second pass, the present disclosure can eliminate the need to read data from the main memory which also reduces memory bandwidth. In some aspects, this reading and writing process can happen multiple times, e.g., during the domain shading process.

As such, multiple read or write requests can be saved because aspects of the present disclosure can store on the GMEM, e.g., GMEM 920. This can save the amount of data needed to be transferred to and/or from the main memory, e.g., to the input primitive assembly 902 in pass 2. For example, aspects of the present disclosure can store hull shader data on the GMEM 920, and then read this data back to the stream processor or domain shader 956.

FIGS. 9A and 9B illustrate an example of the aforementioned processes for reducing memory bandwidth during tessellation use cases. As shown in FIGS. 9A and 9B, aspects of the present disclosure, e.g., CPUs and GPUs herein, can perform a number of different steps or processes to store data on a GMEM in order to reduce memory bandwidth. For instance, GPUs herein can configure a GMEM, e.g., GMEM 920, for storing at least some shading data for each of a plurality of patches, e.g., patch constant data. GPUs herein can also determine the at least some shading data for each of a plurality of patches, e.g., patch constant data.

Additionally, GPUs herein can copy the at least some shading data for each of the plurality of patches, e.g., patch constant data, to the GMEM, e.g., GMEM 920. GPUs herein can also store the at least some shading data for each of the plurality of patches, e.g., patch constant data, in the GMEM, e.g., GMEM 920. GPUs herein can also calculate when the GMEM, e.g., GMEM 920, has stored a maximum amount of shading data, e.g., patch constant data. In some aspects, the at least some shading data, e.g., patch constant data, may no longer be stored in the GMEM, e.g., GMEM 920, when the GMEM has stored the maximum amount of shading data.

Moreover, GPUs herein can divide each of the plurality of patches into one or more sub-patches when the GMEM, e.g., GMEM 920, has stored the maximum amount of shading data, e.g., patch constant data. In some instances, the one or more sub-patches may be tessellated patches. GPUs herein can also communicate the at least some shading data for each of the plurality of patches, e.g., patch constant data. In some aspects, the at least some shading data, e.g., patch constant data, can be communicated to a domain shader or a stream processor, e.g., stream processor or domain shader 956.

Further, GPUs herein can process the at least some shading data, e.g., patch constant data, when the at least some shading data is communicated. In some aspects, the at least some shading data, e.g., patch constant data, can be processed by at least one of a rasterizer, e.g., rasterizer 958, a fragment shader, e.g., fragment shader 960, or an output merger, e.g., output merger 962. GPUs herein can also remove the at least some shading data, e.g., patch constant data, from the GMEM, e.g., GMEM 920, when the at least some shading data is processed. In some instances, the at least some shading data for each of the plurality of patches, e.g., patch constant data, can be hull shader output data.

Figure 10:
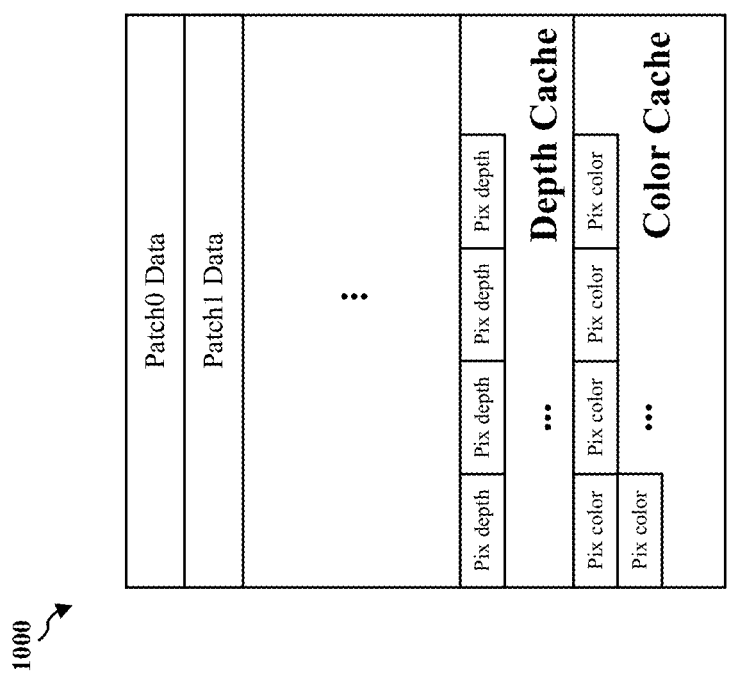
FIG. 10 illustrates an example GMEM layout in accordance with one or more techniques of this disclosure.

FIG. 10 illustrates a GMEM layout 1000 in accordance with one or more techniques of this disclosure. GMEM layout 1000 includes patch data, e.g., patch0 data and patch1 data, a depth cache including a number of pixel depths, and a color cache including a number of pixels colors. As shown in FIG. 10, GMEM layout 1000 is a proposed GMEM layout in a direct rendering mode for tessellation use cases. More specifically, FIG. 10 shows how aspects of the present disclosure may utilize on-chip memory. In some aspects, the unused memory portion in the on-chip memory in direct mode, e.g., as shown in FIG. 8B, may be utilized for the patch information as depicted in FIG. 10.

The aforementioned aspects of the present disclosure can include a number of different advantages. For example, the tessellation use cases herein can reduce the GPU memory bandwidth, improve the GPU performance, and/or the reduce power consumption. For instance, aspects of the present disclosure can perform a number of different steps or processes to store data on a GMEM in order to obtain these advantages. Additionally, the amount of data stored on a system memory can be reduced as aspects of the present disclosure may store data on a GMEM. For example, as the present disclosure may not transfer data to the system memory, aspects of the present disclosure can improve the GPU performance and/or reduce power consumption and memory bandwidth. Aspects of the present disclosure can include a variety of GPU performance improvements, e.g., a 2.4% performance improvement. Aspects of the present disclosure can also include a number of bandwidth reductions, e.g., a 7.5% bandwidth reduction.

Figure 11:
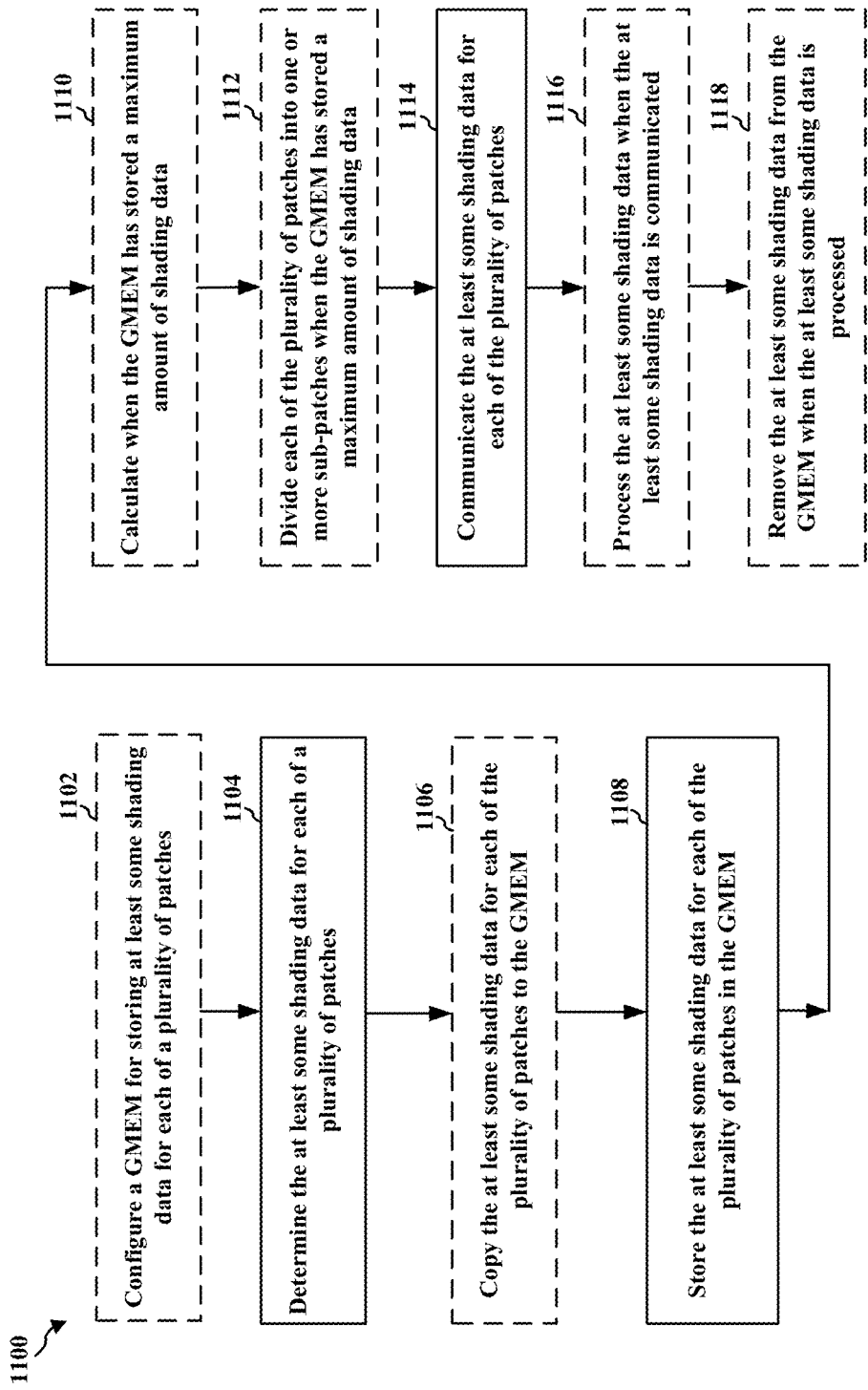
FIG. 11 illustrates an example flowchart of an example method in accordance with one or more techniques of this disclosure.

FIG. 11 illustrates a flowchart 1100 of an example method in accordance with one or more techniques of this disclosure. The method may be performed by an apparatus such as a CPU, a GPU, or an apparatus for graphics processing. At 1102, the apparatus may configure a GMEM for storing at least some shading data for each of a plurality of patches, as described in connection with the examples in FIGS. 5-10.

At 1104, the apparatus may determine the at least some shading data for each of a plurality of patches, as described in connection with the examples in FIGS. 5-10. At 1106, the apparatus can copy the at least some shading data for each of the plurality of patches to the GMEM, as described in connection with the examples in FIGS. 5-10.

At 1108, the apparatus can store the at least some shading data for each of the plurality of patches in the GMEM, as described in connection with the examples in FIGS. 5-10. At 1110, the apparatus can also calculate when the GMEM has stored a maximum amount of shading data, as described in connection with the examples in FIGS. 5-10. In some aspects, the at least some shading data may no longer be stored in the GMEM when the GMEM has stored the maximum amount of shading data, as described in connection with the examples in FIGS. 5-10.

At 1112, the apparatus can divide each of the plurality of patches into one or more sub-patches when the GMEM has stored the maximum amount of shading data, as described in connection with the examples in FIGS. 5-10. In some instances, the one or more sub-patches may be tessellated patches, as described in connection with the examples in FIGS. 5-10. At 1114, the apparatus can also communicate the at least some shading data for each of the plurality of patches, as described in connection with the examples in FIGS. 5-10. In some aspects, the at least some shading data can be communicated to a domain shader or a stream processor, as described in connection with the examples in FIGS. 5-10.

At 1116, the apparatus can also process the at least some shading data when the at least some shading data is communicated, as described in connection with the examples in FIGS. 5-10. In some aspects, the at least some shading data can be processed by at least one of a rasterizer, a fragment shader, or an output merger, as described in connection with the examples in FIGS. 5-10. At 1118, the apparatus can also remove the at least some shading data from the GMEM when the at least some shading data is processed, as described in connection with the examples in FIGS. 5-10. In some instances, the at least some shading data for each of the plurality of patches can be hull shader output data, as described in connection with the examples in FIGS. 5-10.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for determining at least some shading data for each of a plurality of patches. The apparatus may also include means for storing the at least some shading data for each of the plurality of patches in a GMEM. The apparatus may also include means for communicating the at least some shading data for each of the plurality of patches. The apparatus may also include means for configuring the GMEM for storing the at least some shading data for each of a plurality of patches. The apparatus may also include means for calculating when the GMEM has stored a maximum amount of shading data. The apparatus may also include means for dividing each of the plurality of patches into one or more sub-patches when the GMEM has stored the maximum amount of shading data. The apparatus may also include means for processing the at least some shading data when the at least some shading data is communicated. The apparatus may also include means for removing the at least some shading data from the GMEM when the at least some shading data is processed. The apparatus may also include means for copying the at least some shading data for each of the plurality of patches to the GMEM.

The subject matter described herein can be implemented to realize one or more benefits or advantages. For instance, the described graphics processing techniques can be used by a GPU, a CPU, or some other processor that can perform graphics processing to implement the multi-pass tessellation techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize a GMEM to store data that can reduce memory bandwidth and improve performance during the multi-pass tessellation process.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
   tessellating a surface in direct mode rendering by determining at least some shading data for each of a plurality of patches, wherein the surface comprises the plurality of patches;
   storing the at least some shading data for each of the plurality of patches in a graphics processing unit (GPU) memory (GMEM); and
   communicating the at least some shading data for each of the plurality of patches.

2. The method of claim 1, further comprising:
   configuring the GMEM for storing the at least some shading data for each of a plurality of patches.

3. The method of claim 1, further comprising:
   calculating when the GMEM has stored a maximum amount of shading data.

4. The method of claim 3, wherein the at least some shading data is no longer stored in the GMEM when the GMEM has stored the maximum amount of shading data.

5. The method of claim 3, further comprising:
   dividing each of the plurality of patches into one or more sub-patches when the GMEM has stored the maximum amount of shading data.

6. The method of claim 5, wherein the one or more sub-patches are tessellated patches.

7. The method of claim 1, further comprising:
   processing the at least some shading data when the at least some shading data is communicated.

8. The method of claim 7, wherein the at least some shading data is processed by at least one of a rasterizer, a fragment shader, or an output merger.

9. The method of claim 7, further comprising:
   removing the at least some shading data from the GMEM when the at least some shading data is processed.

10. The method of claim 1, further comprising:
    copying the at least some shading data for each of the plurality of patches to the GMEM.

11. The method of claim 1, wherein the at least some shading data for each of the plurality of patches is hull shader output data.

12. The method of claim 1, wherein the at least some shading data is communicated to a domain shader or a stream processor.

13. An apparatus for graphics processing, comprising:
    a memory; and at least one processor coupled to the memory and configured to:

tessellate a surface in direct mode rendering by determining at least some shading data for each of a plurality of patches, wherein the surface comprises the plurality of patches;

store the at least some shading data for each of the plurality of patches in a graphics processing unit (GPU) memory (GMEM); and communicate the at least some shading data for each of the plurality of patches.

14. The apparatus of claim 13, wherein the at least one processor is further configured to:

configure the GMEM for storing the at least some shading data for each of a plurality of patches.

15. The apparatus of claim 13, wherein the at least one processor is further configured to:

calculate when the GMEM has stored a maximum amount of shading data.

16. The apparatus of claim 15, wherein the at least some shading data is no longer stored in the GMEM when the GMEM has stored the maximum amount of shading data.

17. The apparatus of claim 15, wherein the at least one processor is further configured to:

divide each of the plurality of patches into one or more sub-patches when the GMEM has stored the maximum amount of shading data.

18. The apparatus of claim 17, wherein the one or more sub-patches are tessellated patches.

19. The apparatus of claim 13, wherein the at least one processor is further configured to:

process the at least some shading data when the at least some shading data is communicated.

20. The apparatus of claim 19, wherein the at least some shading data is processed by at least one of a rasterizer, a fragment shader, or an output merger.

21. The apparatus of claim 19, wherein the at least one processor is further configured to:

remove the at least some shading data from the GMEM when the at least some shading data is processed.

22. The apparatus of claim 13, wherein the at least one processor is further configured to:

copy the at least some shading data for each of the plurality of patches to the GMEM.

23. The apparatus of claim 13, wherein the at least some shading data for each of the plurality of patches is hull shader output data.

24. The apparatus of claim 13, wherein the at least some shading data is communicated to a domain shader or a stream processor.

25. An apparatus for graphics processing, comprising:

means for tessellating a surface in direct mode rendering by determining at least some shading data for each of a plurality of patches, wherein the surface comprises the plurality of patches;

means for storing the at least some shading data for each of the plurality of patches in a graphics processing unit (GPU) memory (GMEM); and means for communicating the at least some shading data for each of the plurality of patches.

26. The apparatus of claim 25, further comprising:

means for configuring the GMEM for storing the at least some shading data for each of a plurality of patches.

27. The apparatus of claim 25, further comprising:

means for calculating when the GMEM has stored a maximum amount of shading data.

28. The apparatus of claim 27, further comprising:

means for dividing each of the plurality of patches into one or more sub-patches when the GMEM has stored the maximum amount of shading data.

29. The apparatus of claim 25, further comprising:

means for processing the at least some shading data when the at least some shading data is communicated; and means for removing the at least some shading data from the GMEM when the at least some shading data is processed.

30. A non-transitory computer-readable medium storing computer executable code for graphics processing, the code when executed by a processor causes the processor to:

tessellate a surface in direct mode rendering by determining at least some shading data for each of a plurality of patches, wherein the surface comprises the plurality of patches;

store the at least some shading data for each of the plurality of patches in a graphics processing unit (GPU) memory (GMEM); and communicate the at least some shading data for each of the plurality of patches.

* * * * *